United States Patent [19]

Blackington

[11] 4,349,497

[45] Sep. 14, 1982

[54] FIBER OPTIC TERMINATION METHOD AND APPARATUS

[75] Inventor: Paul A. Blackington, Vandling, Pa.

[73] Assignee: Sheltered Workshop for the Disabled, Inc., Binghamton, N.Y.

[21] Appl. No.: 252,087

[22] Filed: Apr. 8, 1981

Related U.S. Application Data

[63] Continuation-in-part of Ser. No. 128,934, Mar. 10, 1980, abandoned.

[51] Int. Cl.$^3$ .................. B29C 27/02; B29D 11/00
[52] U.S. Cl. ................... 264/1.5; 264/230; 264/248; 264/337; 350/96.24; 425/508; 425/517; 425/521
[58] Field of Search ............ 264/1.5, 1.4, 230, 248; 425/508, 517, 520, 521, 509; 350/96.24; 156/296, 309.6, 381, 433, 441, 497

[56] References Cited

U.S. PATENT DOCUMENTS

| | | | |
|---|---|---|---|
| 3,043,910 | 7/1962 | Hicks, Jr. .................. | 264/1.5 |
| 3,119,678 | 1/1964 | Bazinet, Jr. ................ | 264/1.5 |
| 3,215,029 | 11/1965 | Woodcock ................ | 264/1.5 |
| 3,216,807 | 11/1965 | Woodcock ................ | 350/96.24 |
| 3,448,180 | 6/1969 | Opferkuch, Jr. et al. ... | 264/1.5 |
| 3,819,442 | 6/1974 | Brushenko ................ | 156/180 |
| 3,942,965 | 3/1976 | Osagawa et al. .......... | 264/1.5 |
| 3,961,931 | 6/1976 | Nakagawa et al. ........ | 65/152 |
| 4,130,619 | 12/1978 | Held ........................ | 264/248 |
| 4,138,460 | 2/1979 | Tigner ...................... | 264/1.5 |
| 4,211,597 | 7/1980 | Lippo et al. ............... | 156/296 |

FOREIGN PATENT DOCUMENTS

1445141  8/1976  United Kingdom ............ 350/96.24

OTHER PUBLICATIONS

Webster's Third New Intern. Dictionary, p. 843.
Modern Plastics Ency., p. 592 (1968-1969).

*Primary Examiner*—James B. Lowe
*Attorney, Agent, or Firm*—Richard G. Stephens

[57] ABSTRACT

The ends of plastic optical fibers forming a light-transmitting cable are fused in a manner so as to minimize light loss by applying heat to plasticize short end-length portions while containing portions rearwardly thereof within a cavity defined by means having sufficient thermal conductivity and mass that the rearward portions are not heated above the plastic fiber deformation temperature. Both methods and various forms of apparatus for practicing the methods are disclosed.

16 Claims, 8 Drawing Figures

FIBER OPTIC TERMINATION METHOD AND APPARATUS

This application is a continuation-in-part of my co-pending application Ser. No. 128,934 filed Mar. 10, 1980 now abandoned.

This invention relates to a method or process and apparatus for terminating the ends of bundles of plastic (e.g. acrylic) optical fibers, and more particularly, to a terminating method and apparatus which decreases light loss.

Groups of plastic fibers bundled together to form light pipes or light conduits are widely used to transmit light between two locations. The use of a large number of small-diameter plastic fibers in place of a lesser number of larger-diameter plastic fibers can advantageously increase the flexibility of a bundle, allowing it to be used in applications where stiffer bundles could not be used, and it can better concentrate light at the exit end of the bundle, which is ordinarily advantageous, and hence it often becomes desirable to form bundles having a large number of small-diameter fibers.

In most applications it is required that the fiber ends at a given end of the bundle be packed closely together and fixedly secured relative to a light source or a light receiving element. It is desirable, in order that maximum length portions of the bundle remain flexible, that only short-length end portions of the fibers be secured to each other. It is very important that any method used to secure the ends of the fibers not seriously interfere with light transmission through the fibers. It has been known that the ends of bundled quartz glass fibers may be fused together by application of heat. Plastic (e.g. acrylic) fibers are much preferable to glass fibers in some applications, due to their wider numerical aperture and their lower cost, and in some applications they also may be preferred because of greater flexibility. Various attempts have been made in the prior art to similarly fuse ends of plastic optical fibers. So far as I am aware, such attempts have not been successful, mainly because the fusing has resulted in substantial light attenuation or transmission loss, and the only widely used method of terminating plastic optical fibers has involved cementing plastic fiber ends together, ordinarily using epoxy cement. Thus one primary object of the present invention is to provide method and apparatus for fusing the ends of bundles of plastic optic fibers in a manner which results in less light transmission loss. The application of cement to optical fiber ends is disadvantageous for several reasons. It is sometimes difficult to insure that all fibers will be securely cemented or adhered when cement is applied; and if some fibers are found to be loose after the cement has hardened the partially cemented end of a bundle often must be cut off, which may ruin the bundle for a given application. More importantly, the presence of cement between fiber ends disadvantageously tends to increase the overall diameter and cross-sectional area of the bundle end, providing less light intensity per total area at the bundle end. It is desirable to provide maximum light intensity per unit area of fiber ends so as to couple maximum light energy into the fibers, thereby to decrease the effects of attenuation occurring along the fibers. Another important object of the present invention is to provide method and apparatus for fusing end lengths of plastic optical fibers to provide bundle ends having greater light intensity per unit area, or as it is sometimes called, a better "stacking factor".

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

FIGS. 1 and 2 diagrammatically illustrate typical steps in the preparation of an optic fiber cable according to the invention.

In accordance with one form of the present invention, an end length of a bundle of fibers is arranged to extend through a first cavity forming a pre-heat zone, and through an adjacent cavity forming an adjacent post-heat zone, with the ends of the fibers protruding slightly beyond the post-heat zone. The pre-heat zone cavity maintains a length of the cable in a fixed position, and the post-heat zone cavity is arranged to slightly compress the bundle to a desired size, such as a desired diameter, although square shapes could be provided, if desired. The pre-heat zone of the fixture is formed of a material (preferably aluminum) having high thermal conductivity and a substantial mass, and the post heat zone of the fixture is formed of a less thermally conductive material, such as fiber glass or stainless steel. With the cable portion within the preheat zone having been heated to raise the fiber portions therein to a temperature just below the plasticity temperature of the fibers, heat is then applied to the end of the bundle at the post heat zone, to raise the ends of the fibers above the plasticity temperature of the fibers. The substantial mass and high thermal conductivity of the means defining the pre-heat zone cavity prevents the cable portion within that zone from plasticizing or experiencing substantial temperature gradients while the fibers of the short end portion of the cable within the post heat zone fuse together. As the ends of the fibers within the post heat zone fuse together, the bundle apparently shrinks in length, with the end face of the bundle retreating to within the post heat zone cavity of the fixture, but being held to the diameter provided in that cavity. When such shrinking terminates, the application of heat to the post heat zone is terminated. Then both zones of the fixture are cooled sufficiently to insure solidification of the plastic within the post-heat zone, and when such cooling has occurred the bundle is removed from the fixture for final processing of the fused end.

To form a cable in accordance with the present invention the required number of fibers to form a cable end of desired diameter are first formed into a bundle of circular cross-section and tied securely to hold them in the circular cross-section. The number N of fibers required to form a cable having a given finished diameter D from tightly-packed fibers having a diameter d is given approximately by: $N=(0.72D^2/d^2)$ for most cables of practical sizes.

Figure 1:

Assume, for sake of an example, that 450 fibers having a diameter d of 0.010 in. (0.254 mm.) are securely bundled together to provide a bundle approximately 0.25 inch (6.35 mm.) in diameter. The bundle is first tied, i.e. tightly bound as in the manner shown in FIG. 1, at three locations A, B and C. The bundle is shown tied at each location by passage of several (e.g. 2 or 3) turns of nylon string around the bundle, which turns are pulled tight and knotted. Some length of string is preferably left at the rear tie C for a reason made evident below. In FIG. 1 the ends of the fibers are assumed to terminate at E, and from C the fibers lead rightwardly to a source (not shown) such as a mandrel or reel on which fibers are wound. Tie points A and B lie on opposite sides of an intended finished end location approximately at D, and in the example typically might be 2 inches (5.08 cm.) apart. The bundle is then cut through perpendicularly to all of the fibers at D, providing an assembly of the type shown in FIG. 2. The cutting may be done by means of sawing motions with a razor blade-like tool. It is by no means essential that tie A be used on the cable end cut off, but the use of such a tie maintains the fibers in better parallelism and tends to provide a better finished product.

Figure 3:
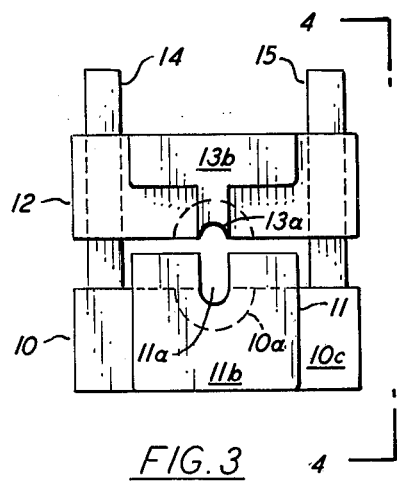
FIG. 3 is a front elevation view illustrating one form of fusing fixture constructed according to the invention.
Figure 4:
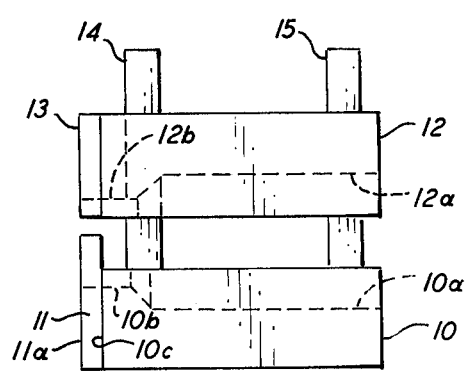
FIG. 4 is a view taken at lines 4—4 in FIG. 3.

The cable end to be fused is then placed in a fusing fixture which is illustrated in FIGS. 3 and 4. A lower portion of the fusing fixture is shown as comprising an aluminum block 10 having a semi-cylindrical rear recess 10a which converges to a smaller-diameter semi-cylindrical recess 10b at a side 10c of block 10 which will be designated the front side. A fiber glass front side member 11 affixed to block 10 by screws (not shown) is provided with a slot 11a having a semi-cylindrical shape registering with recess 10b.

An upper portion of the fusing fixture comprises an aluminum block 12 provided with semi-cylindrical recesses 12a and 12b identical to and mating with recesses 10a and 10b, respectively, and with a fiber glass front member 13 having a semi-cylindrical recess 13a mating with recess 12b. A pair of guide pins 14, 15 staked in lower block 10 slidingly protrude through guide holes in upper block 12 to insure that the recesses in the respective halves of the fusing fixture will be accurately aligned when block 12 is lowered to rest against block 10.

Figure 2:
Figure 5:
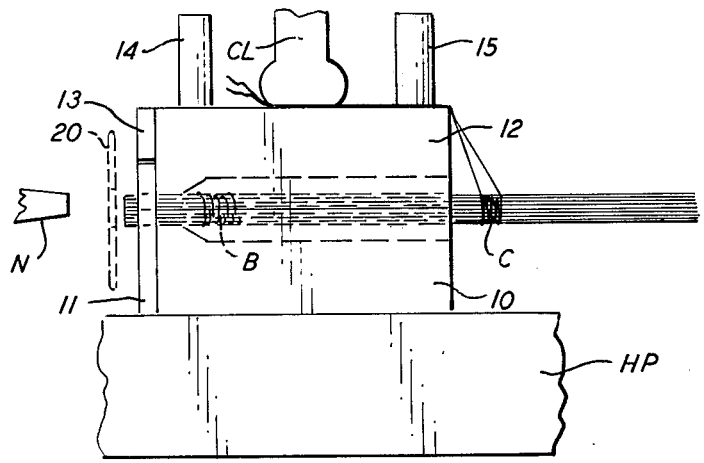
FIG. 5 is a side elevation view illustrating a cable and clamped on the fusing fixture, with the fusing fixture clamped within a heating device, and with hot gas being played on the end of the cable bundle via a nozzle.

A cable end prepared to the form shown in FIG. 2 is shown clamped in the fusing fixture in FIG. 5. The tie at B is located far enough back from the cut fiber ends that small lengths (e.g. ⅜ inch) of each of the fiber ends protrude out of the fixture past the front faces 11b, 13b of the fiber glass members. With the two blocks 10, 12 of the fusing fixture pressed together, the fiber bundle will be seen to extend through an enlarged cylindrical rear cavity where it is loosely contained, through a lesser-diameter cylindrical cavity formed by recesses 10b and 12b where it is clamped or held, and through the cylindrical cavity of the same diameter formed in fiber glass front members 11 and 13. The cylindrical cavity formed by the fiber glass members defines the mentioned post-heat zone, and the cylindrical cavities formed within the aluminum members 10 and 12 defines the pre-heat zone.

In one satisfactory fusing fixture which has been constructed, the blocks 10 and 12 of the fusing fixture each comprise a $2\times2\times\frac{1}{2}$ inch (5.08×5.08×1.27 cm.) block of aluminum. The rear cylindrical recess formed by recesses 10a and 12a had a diameter of 0.5 inch (1.27 cm.) and a length of 1.75 inch (4.445 cm.). The smaller cylindrical recess formed by recess 10b and 12b had a diameter of 0.25 inch (0.635 cm.) and a length of 0.188 inch (0.48 cm.). Each front member 11 and 13 comprised a piece of fiber glass 0.125 inch (0.3115 cm.) thick.

With the bundle in the assembled fixture, one then pulls on the ends of the rear cable tie at C and fastens them to the fixture to hold the bundle in place. In FIG. 5 the cable tie ends are shown merely trapped between upper block 12 and a portion of clamp CL which clamps the fixture atop a heating platform HP. It will be apparent that clips (not shown) or the like may be provided on one or both of blocks 10 and 12 to facilitate attachment of the cable tie ends. The cable tie C is attached to the fixture merely to prevent cable motion while a fusing operation to be described occurs. With the bundle installed as shown in FIG. 5, the bundle is then cut off adjacent the front face of fiber glass members 11, 13 using a razor-sharp blade (not shown). A thin (0.030 inch) metal plate having an aperture slightly exceeding the cable diameter may be placed over the end of the bundle against the fiber glass members while such cutting is done in order to avoid scoring or wear of the fiber glass members, and in FIG. 5 such a plate is shown in phantom at 20. After the cutting is accomplished, the end of the bundle will protrude 0.030 inch (0.08 cm.) beyond the front faces of fiber glass members 11, 13. The fusing fixture with the cable end clamped inside is then clamped in a heating device HP, which heats both top and bottom of the fixture, up to a temperature of about 170° F. (77° C.).

An important concept of the present invention is that the fusing fixture be heated until it, and the bundle portion inside it, rise to a temperature just below the deflection temperature of the fibers. The deflection temperature is defined as that for 66 psi fiber stress given by ASTM test method D648, and for acrylic optical fibers the deflection temperature is approximately 175° F. (79° C.). In accordance with the invention the fusing fixture is heated preferably to within 90% to 95% of the deflection temperature of the fibers. It is very important that the fixture temperature not exceed the fiber deflection temperature.

After the fixture has reached the desired temperature just below the fiber deflection temperature, added heat is applied to the fiber bundle end by application of heated air (or an air-gas mixture) to the bundle end, playing the heated air against the bundle end and some of the fiberglass surrounding the bundle end, until the fiber ends all retract to within the cylindrical cavity defined by fiber glass members 11 and 13. In a typical application a 600° F. flameless torch may be used to direct hot air at the bundle end for 30 to 45 seconds, with the nose of the torch held about 0.125 inch (0.32 cm.) from the bundle end. The pressure or velocity at which the hot air strikes the end of the bundle is not important, although very high pressures which would severely distort the end of the bundle should not be used. The application of the hot air blast to the end of the bundle often does distort the fusing for a distance of a few thousandths (e.g. 0.010–0.020) of an inch into the cable so that that much of the fused end becomes unusable, but it may be readily ground off, providing a properly fused end into which light is readily transmitted. Importantly, due to the substantial mass of blocks 10 and 12, and their high thermal conductivity compared to the lower thermal conductivity of the fiberglass members, the heat added by means of the torch can fuse the bundle end without fusing cable portions of the fiber bundle appreciably inside the blocks. The variation of temperature gradients near the interface of the metal and fiber glass members is not known precisely, but it is believed to be gradual and smooth, as is further discussed below.

In the example being described for an 0.25 inch (0.64 cm.) diameter cable which initially protrudes about 0.030 inch (0.08 cm.) beyond the front faces of the fiber glass members, the end of the bundle typically moves rearwardly a distance of about 0.0625 inch (0.159 cm.) as hot air is applied. After the bundle end has retracted a given distance it tends to stop even if one continues to apply heated air, and application of heat should be discontinued at that time. It is important that the fixture and cable end not be jarred while hot air is being applied to the cable end, nor for a short time thereafter while the fused end solidifies.

After the application of heated air has been terminated, the fixture is slowly cooled, by removing the fixture from the heating platform HD and allowing the fixture temperature to descend toward room air temperature (e.g. 70° F., or 21° C.). When the fixture temperature has descended substantially below the fiber plasticity temperature, to say 120° F. (49° C.) for example, the two halves of the fixture may be separated and the cable end removed. The fused end of the fixture then may be ground and polished, using conventional grinding and buffing equipment, and fitted with a ferrule or the like, depending on how the cable is to be used.

Figure 6A:
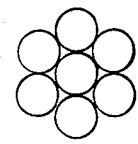
FIGS. 6a and 6b are diagrammatic views useful for understanding the invention.
Figure 6B:
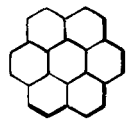

After a cable end which has been fused in the above-described manner has been polished, it can be determined, by microscopic examination of the end surface, that many of the individual fiber ends have been transferred from their original circular shape depicted in FIG. 6a to a hexagonal shape as depicted in FIG. 6b. It is believed that each fiber having a hexagonal end gradually flares into its original circular cross-section over a short length intermediate the fiber portion which is plasticized and the contiguous portion near the front of the pre-heat zone which was not allowed to plasticize, and it is believed that gradual and uniform flaring of many fibers in such a fashion, without fracturing or displacement of the cladding from around individual fibers, is responsible for the small attenuation which occurs.

Figure 7:
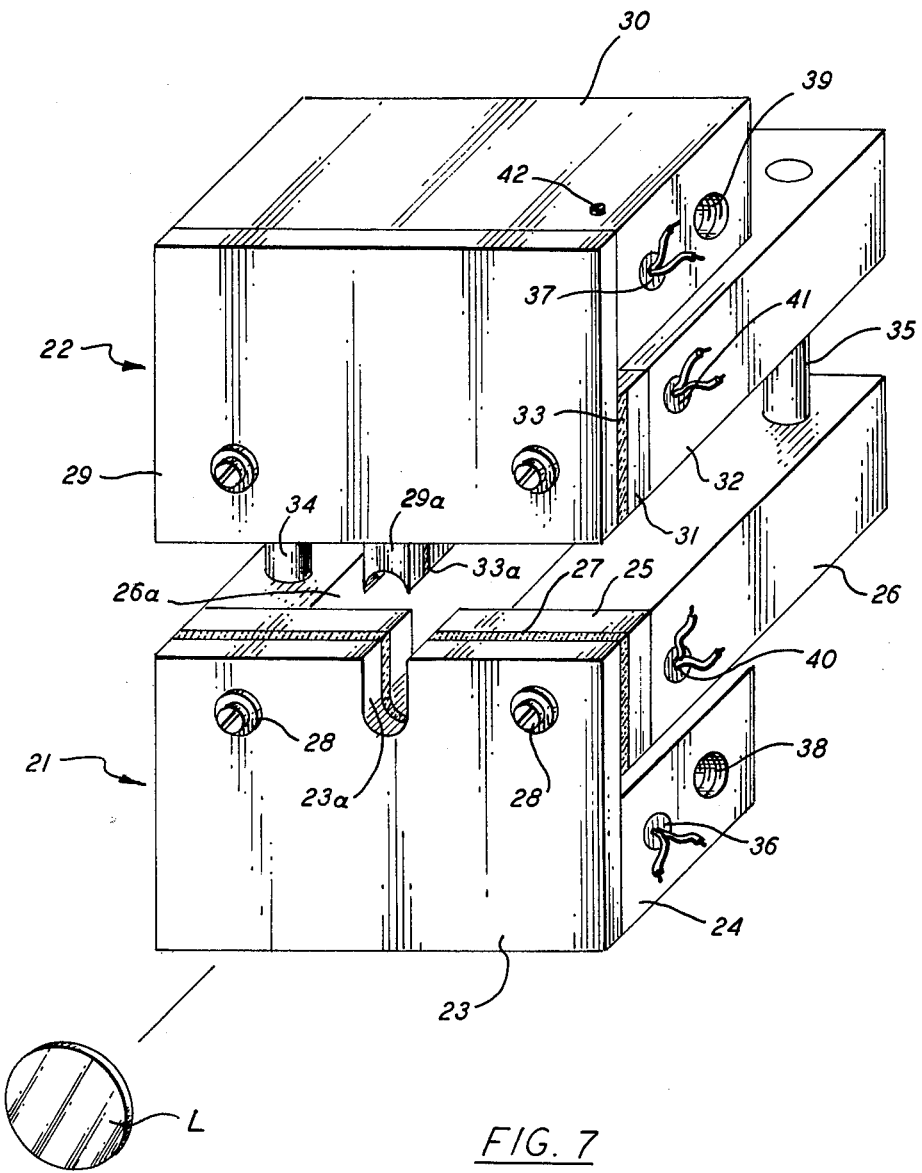
FIG. 7 is an isometric view illustrating a preferred form of apparatus.

An understanding of preferred forms of method and apparatus may be had by reference to FIG. 7. The apparatus thereshown comprises generally similar lower and upper halves 21, 22 which are shown partially separated. The lower half of the assembly comprises a front steel plate 23 which carries a lower metal block 24 attached to readily allow heat exchange between plate 23 and block 24. Block 24 may be welded or brazed to plate 23, and, if desired, they could be integrally formed, i.e. machined from the same piece of metal. Front plate 23 also carries a rear plate 25 and a metal (preferably aluminum) block 26. Plate 25 and block 26 may be integrally formed, if desired. Plate 25 and block 26 are fastened to front plate 23 to provide poor thermal contact or little heat transfer between plates 23 and 25, a thin sheet of insulation 27, such as mica 0.020 inch thick, being interposed therebetween. A small amount of heat transfer does occur through screws 28, 28 which pass through plate 23, insulation 27 and plate 25 into block 26 to hold these parts together. The upper half 22 of the assembly comprises front plate 29 having block 30 affixed thereto with good thermal contact, and having plate 31 and block 32 insulated from plate 29 by insulation sheet 33. A pair of pins 34, 35 staked in holes in block 26 of the lower half engage mating holes in block 32 of the upper half to guide the two halves of assembly together.

Plates 23 and 25 of the lower half, and insulation sheet 27 spaced between those plates, each are provided with a slot extending downwardly from their respective upper edges, the slot in plate 23 being labelled 23a and shown having a semi-circular bottom. The edges of the slots in plate 25 and sheet 27 register with the edges of slot 23a in plate 23. A large recess 26a extends the length of block 26. Plates 29 and 31 of the upper half of the assembly and insulation sheet 33 spaced between those plates, each are provided with a tongue portion extending downwardly from their respective lower edges, the tongue portion of plate 29 being labelled 29a and shown terminating with a semi-cylindrical lower edge or surface. The lower edges of the tongue portions of plate 31 and insulation sheet 33 register with those of tongue portion 29a. The width of the tongue portions of the upper half of the assembly is very slightly less than the width of the slots in the lower half, just enough less to allow the tongue portions to be lowered into and lifted out of the slots without undue friction. The length of the tongue portions is related to the depth of the slots so that when the upper half is fully lowered, the semi-cylindrical slot edges of the lower half of the assembly cooperate with the semi-cylindrical tongue surfaces of the upper half of the assembly to provide three cylindrical zones having a common diameter and spaced adjacent each other.

Blocks 24 and 30 are each provided with a crosswise bore in which a respective conventional cylindrical electrical heating element 36 or 37 is located. Blocks 24 and 30 each are also preferably provided with a respective crosswise through bore 38 or 39 the ends of which are threaded to accommodate fluid piping connectors (not shown), allowing water or another fluid to be passed through blocks 24 and 30. Blocks 26 and 32 also are each provided with a respective crosswise bore in which conventional electrical heating elements 40 and 41 are contained. Each heating element is preferably held in its respective block by one or more set screws, such as screw 42.

With the two halves of the assembly partly separated as shown, a bundle of optic fibers may be laid atop the lower half 21, with the bundle extending through recess 26a, lying in the slots of the lower half and extending slightly beyond the outer face of front plate 23. Then as the upper half 22 is lowered, the tongue portions force the bundle into a cylindrical configuration. The use of such a tongue and slot arrangement makes it easier to pack or shape the unfused bundle into a cylindrical configuration and prevents fibers from being caught between non-cylindrical surface portions of the two halves of the assembly.

The cylindrical post heat zone in which fusing takes place is formed by the mating semi-cylindrical surfaces of slot 23a and tongue 29a. The thermal mass of metal plates 23, 29 and blocks 24 and 30 in close thermal contact therewith is far greater, of course, than that of fiber glass pieces 11, 13 in FIGS. 3-5, and the use of such means, electrically heated, tends to provide more evenly distributed and predictable heating than that which one can provide predictably with a flameless torch, thereby resulting in more uniform fusing and cable ends having less light loss. The use of a metal (high heat conductivity) post heat zone heated in the manner shown tends to provide uniform heating around the entire periphery of the bundle, causing less distortion of the outer layers of fibers of the bundle. The plates 23, 29 are heated to approximately 250° F. to fuse the fibers, by control of heating elements 36 and 37. The cylindrical preheat zone is formed by mating semi-cylindrical surfaces of plates 25 and 31. The temperature of blocks 26, 32, and plates 25, 31 which they thermally contact, is maintained just below the deformation temperature of the plastic fibers by control of heating elements 40 and 41. Any of a variety of different types of thermal sensors may be fitted on various of the blocks to provide automatic regulation of temperature.

In typical practice of the invention using apparatus of the nature shown in FIG. 7, a fiber bundle is laid to extend through the slots of the lower half, with an eighth inch or more extending forwardly past the front face of plate 23, and then the assembly is closed. The bundle is tightly gripped in the preheat and post heat zones. With the preheat zone heated to a temperature just below the deformation temperature, heating of the post-heat zone plates 23 and 29 causes the end of the fiber bundle to retreat inwardly toward the post heat cavity, filling in the voids between fibers. When such retreating ceases, the portion of the cable end still protruding beyond the front face of plate 23 is severed, or sliced off perpendicularly, preferably by moving a hot (e.g. 500° F.) knife blade against the front face of plate 23, though various other cleaving-type cutting devices may be used. The use of metal plate 23 in the fusing zone offers a further advantage over the use of fiber glass in a production environment in that metal plates are less subject to wear from cutting operations. Deterioration of fiber glass due to overheating from the flameless torch is also avoided. After fusing has occurred cooling can be conveniently accelerated by circulating cooling fluids through bores 38 and 39. Cooling bores 38 and 39 may be omitted in some applications of the invention.

Metal plates 23 and 29 will be seen to apply heat directly to the outer fibers of a bundle, so that centrally-located fibers inside the bundle tend to be heated with some time lag. While that makes little or no difference in the case of cables of modest diameter, when some cables of larger diameter are to be fused, a central portion of the end of the bundle advantageously may be heated by fourth means, such as by application of high-intensity focused light to a central portion of the bundle end while metal plates 23, 29 are heating the outside of the bundle. Lens L in FIG. 7 diagrammatically indicates such application of added heating to the bundle end. In cases where such added heat is applied to the central portion of the bundle, the fiber ends are cut off so as to protrude a short predetermined distance (e.g. one-sixteenth inch) before the fusing zone nears fusing temperature.

While the bottoms of the plate in the lower half and the lower ends of the tongue portions of the upper half are shown provided with semi-cylindrical surfaces, it will become apparent that other shapes may be used, if desired, such as flat surfaces to provide a square or rectangular fused cable end.

While the invention has been illustrated with reference to an exemplary cable diameter and an exemplary number of fibers of an exemplary diameter, it will become apparent to those skilled in the art upon a perusal of this disclosure that the principles of the invention are applicable as well to cables of many different sizes, numbers of fibers and fiber diameters, and that the dimensions of the fixture illustrated may be scaled upwardly or downwardly to accommodate different cable sizes.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. The method of fusing together end portions of a bundle of plastic optic fibers to form a cable end, comprising the steps of: containing a first length portion of said bundle adjacent the ends of said fibers within a first cavity with the ends of said fibers exposed at an end of said first cavity; containing a second length portion of said bundle adjacent said first length portion within a second cavity; heating said second length portion of said bundle to a predetermined temperature slightly below the deformation temperature of said plastic fibers; and applying heat to said first length portion for a time sufficient to fuse said fibers within said first length portion while maintaining the temperature of said second length portion substantially constant at said predetermined temperature.

2. The method of claim 1 wherein said ends of said fibers retreat through said first cavity toward said second cavity as heat is applied to said first length portion, said step of applying heat being terminated when said ends of said fibers have ceased retreating.

3. The method of claim 1 wherein said step of applying heat to said first length portion comprises directing a flow of heated gas against said ends of said fibers.

4. The method of claim 1 wherein said step of heating said second length portion comprises heating members defining said second cavity, and wherein said step of maintaining the temperature of said second length portion substantially constant comprises maintaining the temperature of said members defining said second cavity substantially constant.

5. The method of claim 1 wherein said step of applying heat to said first length portion comprises heating members which define said first cavity and contact the periphery of said first length portion.

6. The method of claim 5 which includes the step of applying radiation to a central portion of the end of said bundle of fibers.

7. The method of fusing together end portions of a bundle of plastic optic fibers to form a cable end, comprising the steps of heating a zone of said bundle spaced rearwardly from the end of said bundle to a first temperature slightly below the deformation temperature of said plastic fibers, and then applying heat to an end portion of said bundle adjacent to and forward from said zone for a time sufficient to fuse said end portion of said bundle while simultaneously maintaining the temperature of said bundle within said zone substantially constant at said first temperature.

8. Apparatus for fusing together end portions of a bundle of plastic optic fibers to form a cable end having improved light transmission per unit area, comprising, in combination: first means defining a first cavity which is closed except at first and second ends and which has a uniform cross-section between said first and second ends; second means defining a second cavity having a first end registering with the second end of said first cavity, said first means and said second means each comprising first and second relatively movable members movable toward each other to contain a respective length portion of said bundle of fibers; means for heating said second means to a predetermined temperature slightly below the deformation temperature of said plastic fibers; and means for applying sufficient heat to said first cavity to fuse fibers within said first cavity without substantially varying the temperature of said means defining said second cavity, whereby end portions of fibers within said first cavity may decrease in length and increase in diameter to provide a fused cable end having said cross-section.

9. Apparatus according to claim 8 wherein said second means has a greater thermal mass than said first means.

10. Apparatus according to claim 8 wherein each of said members of said second means has a greater thermal conductivity than the members of said first means.

11. Apparatus according to claim 10 wherein said second means is formed of metal and said first means is formed of fiber glass.

12. Apparatus according to claim 8 wherein each of said cavities are cylindrical.

13. Apparatus according to claim 8 wherein said movable members of said first means each comprises a metal member carrying a respective electrically operated heating element.

14. Apparatus according to claim 8 wherein said movable members of said second means comprises a metal member carrying a respective electrically operated heating element.

15. Apparatus according to claim 8 wherein said first member of said first means is mechanically affixed to said first member of said second means and thermally insulated therefrom by a thin layer of insulation spaced between said members.

16. Apparatus according to claim 8 wherein said movable members of said first means each comprises a metal block having a passage therethrough, and wherein said means for applying heat to said first cavity comprises means for circulating heated fluid through said passages.

* * * * *